(12) United States Patent  
Marshall et al.

(10) Patent No.: US 9,064,121 B2  
(45) Date of Patent: *Jun. 23, 2015

(54) NETWORK DATA TRANSMISSION ANALYSIS

(71) Applicant: Amazon Technologies, Inc., Reno, NV (US)

(72) Inventors: Bradley E. Marshall, Bainbridge Island, WA (US); Charles D. Phillips, Bremerton, WA (US); Eric J. Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,359

(22) Filed: Oct. 18, 2013

(65) Prior Publication Data

US 2014/0047503 A1 Feb. 13, 2014

Related U.S. Application Data

(63) Continuation of application No. 12/892,741, filed on Sep. 28, 2010, now Pat. No. 8,565,108.

(51) Int. Cl.  
*G06F 21/60* (2013.01)  
*H04L 29/06* (2006.01)

(52) U.S. Cl.  
CPC .............. *G06F 21/60* (2013.01); *H04L 63/20* (2013.01); *H04L 63/0227* (2013.01)

(58) Field of Classification Search  
CPC ...... G06F 21/60; H04L 63/20; H04L 63/0227  
USPC ............... 370/241, 252; 726/1; 709/223–225  
See application file for complete search history.

(56) References Cited

U.S. PATENT DOCUMENTS

| 6,934,702 | B2 | 8/2005 | Faybishenko et al. |
| 7,716,240 | B2 | 5/2010 | Lim |
| 7,882,247 | B2 | 2/2011 | Sturniolo et al. |
| 7,991,747 | B1 | 8/2011 | Upadhyay et al. |
| 8,051,187 | B2 * | 11/2011 | Noy et al. ..................... 709/229 |

(Continued)

OTHER PUBLICATIONS

Zhu et al., "Algorithms for assigning substrate network resources to virtual network components", IEEE INFOCOM 2006, Apr. 2006, in 14 pages.

(Continued)

*Primary Examiner* — Kevin Mew  
(74) *Attorney, Agent, or Firm* — Knobbe, Martens, Olson & Bear, LLP

(57) ABSTRACT

Network computing systems may implement data loss prevention (DLP) techniques to reduce or prevent unauthorized use or transmission of confidential information or to implement information controls mandated by statute, regulation, or industry standard. Implementations of network data transmission analysis systems and methods are disclosed that can use contextual information in a DLP policy to monitor data transmitted via the network. The contextual information may include information based on a network user's organizational structure or services or network infrastructure. Some implementations may detect bank card information in network data transmissions. Some of the systems and methods may be implemented on a virtual network overlaid on one or more intermediate physical networks that are used as a substrate network.

22 Claims, 13 Drawing Sheets

(56) References Cited

U.S. PATENT DOCUMENTS

| | | |
|---|---|---|
| 8,060,596 B1 | 11/2011 | Wootton et al. |
| 8,224,796 B1 | 7/2012 | Shinde et al. |
| 8,244,745 B2 | 8/2012 | Lim |
| 8,291,258 B2 * | 10/2012 | Narayanaswamy et al. .. 714/4.12 |
| 8,321,560 B1 * | 11/2012 | Pai et al. ........................ 709/224 |
| 8,341,734 B1 | 12/2012 | Hernacki et al. |
| 8,365,243 B1 | 1/2013 | Lu et al. |
| 8,416,709 B1 * | 4/2013 | Marshall et al. .............. 370/252 |
| 8,438,630 B1 * | 5/2013 | Clifford .......................... 726/13 |
| 8,516,597 B1 * | 8/2013 | Sharma et al. .................. 726/25 |
| 8,555,383 B1 * | 10/2013 | Marshall et al. ................ 726/22 |
| 8,565,108 B1 | 10/2013 | Marshall et al. |
| 8,826,443 B1 * | 9/2014 | Raman et al. ................... 726/26 |
| 2004/0215978 A1 | 10/2004 | Okajo et al. |
| 2005/0195743 A1 | 9/2005 | Rochberger et al. |
| 2007/0179987 A1 | 8/2007 | Lim |
| 2008/0022376 A1 | 1/2008 | Ke et al. |
| 2009/0158430 A1 | 6/2009 | Borders |
| 2009/0232300 A1 | 9/2009 | Zucker et al. |
| 2009/0241114 A1 | 9/2009 | Kirihata |
| 2009/0287734 A1 * | 11/2009 | Borders ........................ 707/102 |
| 2010/0036779 A1 * | 2/2010 | Sadeh-Koniecpol et al. ... 706/11 |
| 2010/0115614 A1 | 5/2010 | Barile et al. |
| 2010/0161830 A1 | 6/2010 | Noy et al. |
| 2010/0162347 A1 | 6/2010 | Barile |
| 2010/0165876 A1 | 7/2010 | Shukla et al. |
| 2010/0242088 A1 | 9/2010 | Thomas |
| 2010/0269171 A1 | 10/2010 | Raz et al. |
| 2011/0083190 A1 | 4/2011 | Brown et al. |
| 2011/0113466 A1 | 5/2011 | Stringham et al. |
| 2011/0113467 A1 | 5/2011 | Agarwal et al. |
| 2011/0289134 A1 | 11/2011 | de los Reyes et al. |
| 2012/0151551 A1 | 6/2012 | Readshaw et al. |

OTHER PUBLICATIONS

Chowdhury et al., "Network Virtualization: State of the Art and Research Challenges", IEEE Communications Magazine, pp. 20-26, Jul. 2009.

Chowdhury et al., "Virtual Network Embedding With Coordinated Node and Link Mapping", IEEE INFOCOM 2009, Apr. 2009, in 9 pages.

Yu et al., "Rethinking Virtual Network Embedding: Substrate Support for Path Splitting and Migration", ACM SIGCOMM Computer Communication Review, vol. 38, Issue 2, Apr. 2008, in 13 pages.

"VMware preparing data loss prevention features for vShield", Network World, Aug. 8, 2011, downloaded from http://www.networkworld.com/news/2011/080811-vshield.html, in 2 pages.

VMware Integrated Partner Solutions for Networking and Security, VMware, Inc., 2012, in 5 pages.

Delaney, D, "Monitoring in the VMWare World", Dec. 15, 2010, downloaded from http://www.lovemytool.com/blog/2010/12/monitoring-in-the-vmware-world-by-darragh-delaney.html, in 6 pages.

* cited by examiner

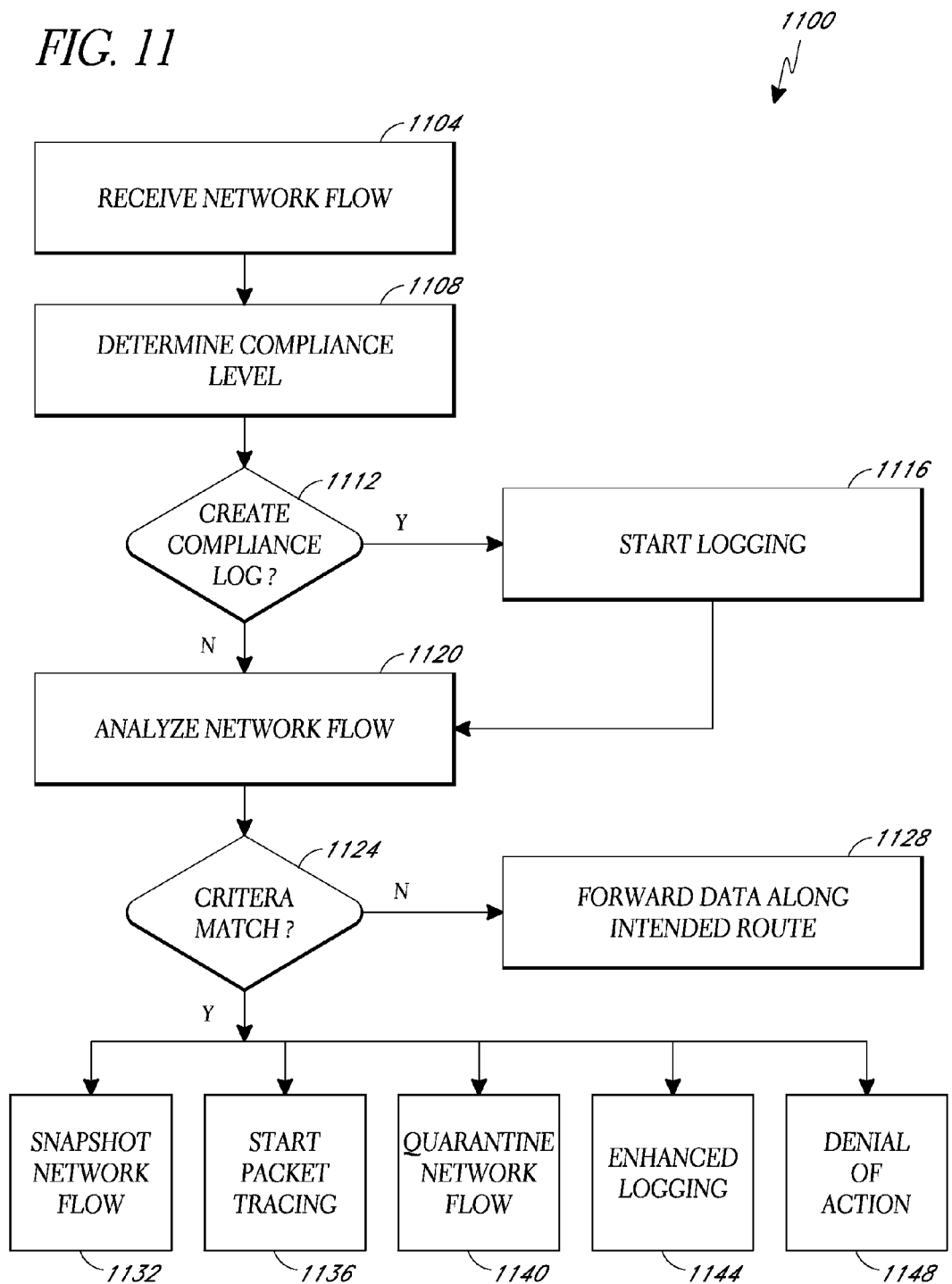

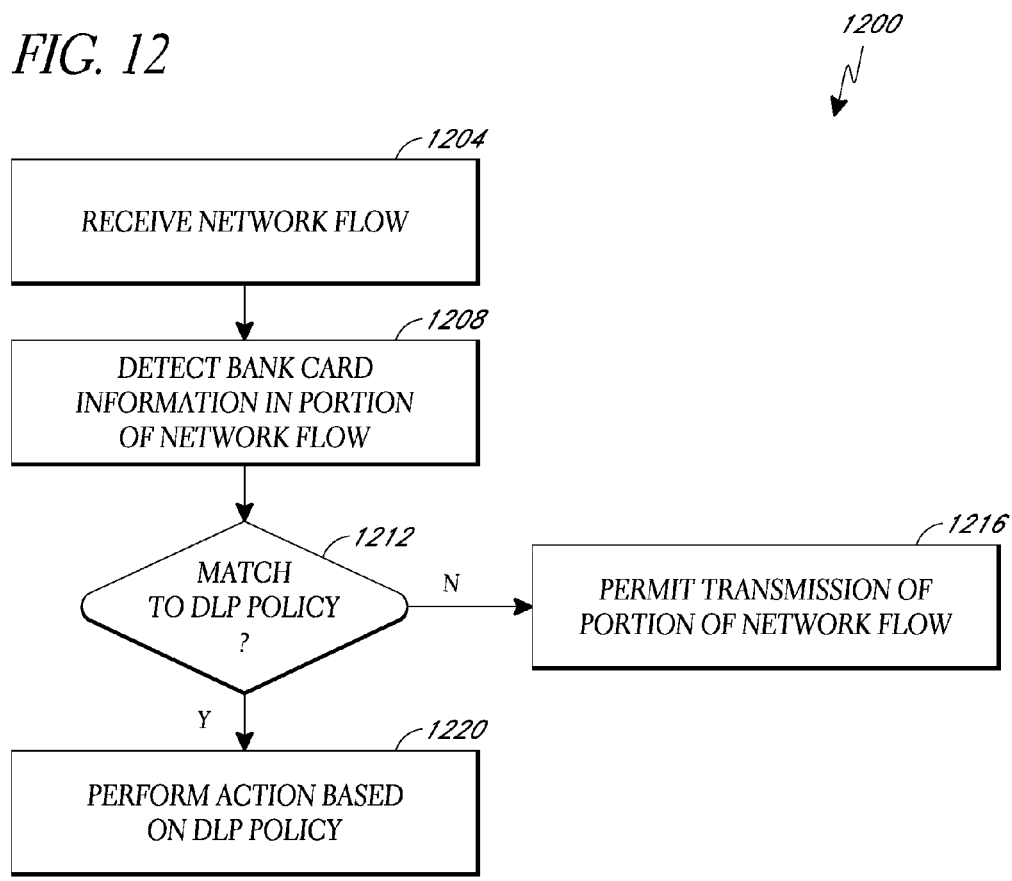

NETWORK DATA TRANSMISSION ANALYSIS

CROSS-REFERENCE TO RELATED APPLICATIONS

This application is a continuation of U.S. patent application Ser. No. 12/892,741, entitled "NETWORK DATA TRANSMISSION ANALYSIS," filed on Sep. 28, 2010, now U.S. Patent No. 8,565,108, which is hereby incorporated by reference herein.

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data. Payload data may include the information that is to be exchanged over the communication network.

In practice, in a packet-switched communication network, packets are transmitted among multiple physical networks, or sub-networks. Generally, the physical networks include a number of hardware devices that receive packets from a source network component and forward the packet to a recipient network component. The packet routing hardware devices are typically referred to as routers. With the advent of virtualization technologies, networks and routing for those networks can now be simulated using commodity hardware rather than actual routers.

A typical packet-switched communication network can implement data loss prevention (DLP) systems or techniques to monitor data transmitted via the network in order to detect and/or prevent unauthorized transmission of data. As the scale and scope of data transmission has increased or in packet-switched communication networks in which at least a portion of the network is implemented in a virtualized environment, the administration and management of DLP systems has become increasingly complicated.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 11 illustrates an example method for analyzing data transmitted over a network; and FIG. 12 illustrates an example method for analyzing bank card information.

DETAILED DESCRIPTION

Figure 1:
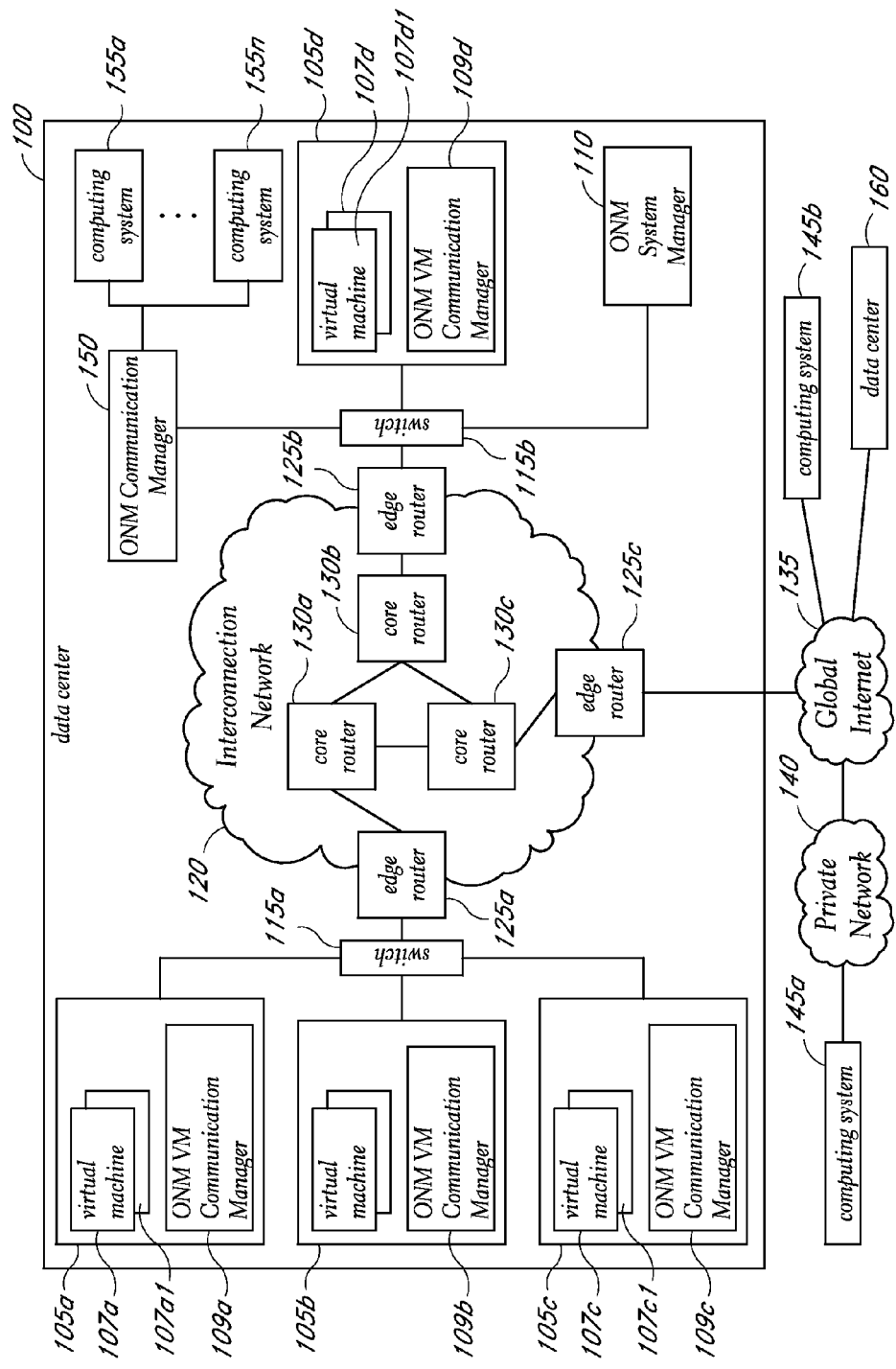
FIG. 1 is a network diagram illustrating an embodiment of a substrate network having computing nodes associated with a virtual computer network.

Network computing systems may implement data loss prevention (DLP) techniques to reduce or prevent unauthorized use or transmission of confidential information or to implement information controls mandated by statute, regulation, or industry standard. Embodiments of network data transmission analysis systems and methods are disclosed that can use contextual information in DLP policies to monitor data transmitted via the network including, for example, a virtual network comprising a substrate network (including physical computing nodes) associated with an overlay network, which is at least partially simulated by the substrate network. The contextual information may include information based on a network user's organizational structure or services rather than being based on network topology. Some embodiments of the systems and methods may be implemented on a virtual network overlaid on one or more intermediate physical networks that are used as a substrate network. A possible advantage of some implementations is that the network data transmission analysis system has the capability of monitoring all the network flows (e.g., network packets) that are transmitted by a virtual network. For example, a DLP policy may include a request for compulsory inspection of all network flows including information that matches one or more criteria established by the DLP policy.

The following section discusses various embodiments of managed networks for network data transmission analysis. Following that is further discussion of network data transmission analysis systems and methods that can implement DLP policies established by a network user.

Managed Computer Networks for Network Data Transmission Analysis

With the advent of virtualization technologies, networks and routing for those networks can now be simulated using commodity hardware rather than actual routers. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

Aspects of the present disclosure will be described with regard to illustrative logical networking functionality for managed computer networks, such as for virtual computer networks that are provided on behalf of users or other entities. In at least some embodiments, the techniques enable a user to configure or specify a network topology, routing costs, routing paths, and/or other information for a virtual or overlay computer network including logical networking devices that are each associated with a specified group of multiple physical computing nodes. For example, the user (e.g., a network administrator for an organization) may configure or specify organizational details (e.g., departmental structure of the organization) such that the virtual or overlay network can associate network data transmissions (e.g., network packets) as outgoing from or incoming to a particular portion of the organization (e.g., a packet outgoing from an accounting department, a packet incoming to a human resources group, etc.). With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
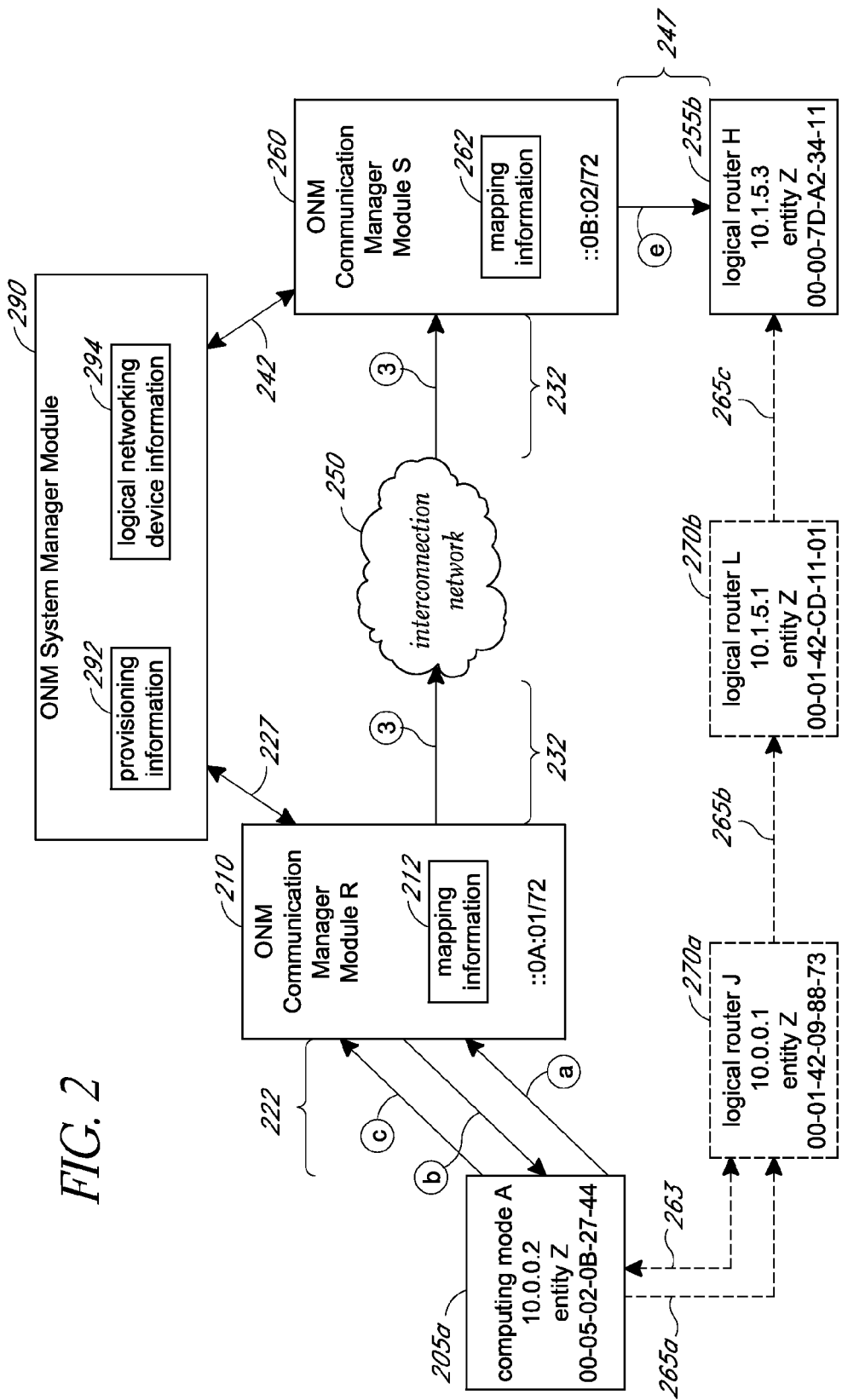
FIG. 2 illustrates an example embodiment of a virtual computer network supporting logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. One skilled in the relevant art will appreciate, however, that the disclosed virtual computer network is illustrative in nature and should not be construed as limiting.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109*a* and 109*c* manages associated virtual machine computing nodes 107*a* and 107*c* and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107*a*1 on computing system 105*a* can be part of the same virtual local computer network as one of the virtual machine computing nodes 107*d*1 on computing system 105*d*.

The virtual machine 107*a*1 can then direct an outgoing communication to the destination virtual machine computing node 107*d*1, such as by specifying a virtual network address for that destination virtual machine computing node. The Communication Manager module 109*a* receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109*a* can determine the actual physical network location corresponding to the destination virtual network address for the communication. For example, the Communication Manager module 109*a* can determine the actual destination network address by dynamically interacting with the System Manager module 110, or can have previously determined and stored that information. The Communication Manager module 109*a* then re-headers or otherwise modifies the outgoing communication so that it is directed to Communication Manager module 109*d* using an actual substrate network address.

When Communication Manager module 109*d* receives the communication via the interconnection network 120, it obtains the virtual destination network address for the communication (e.g., by extracting the virtual destination network address from the communication), and determines to which virtual machine computing nodes 107*d* the communication is directed. The Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards the modified communication to the destination virtual machine computing node 107*d*1. In at least some embodiments, before forwarding the incoming communication to the destination virtual machine, the Communication Manager module 109*d* can also perform additional steps related to security.

Further, the Communication Manager modules 109*a* and/or 109*c* on the host computing systems 105*a* and 105*c* can perform additional actions that correspond to one or more logical specified router devices lying between computing nodes 107*a*1 and 107*c*1 in the virtual network topology. For example, the source computing node 107*a*1 can direct a packet to a logical router local to computing node 107*a*1 (e.g., by including a virtual hardware address for the logical router in the packet header), with that first logical router being expected to forward the packet to the destination node 107*c*1 via the specified logical network topology. The source Communication Manager module 109*a* receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109*c* after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115*a*-115*b* are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270*a* and 270*b* in logically sending the communication.

In this example, computing nodes A 205*a* and H 255*b* are part of a single virtual computer network for entity Z. However, computing nodes can be configured to be part of two distinct sub-networks of the virtual computer network and the logical router devices 270*a* and 270*b* separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-c to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-c is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-e by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
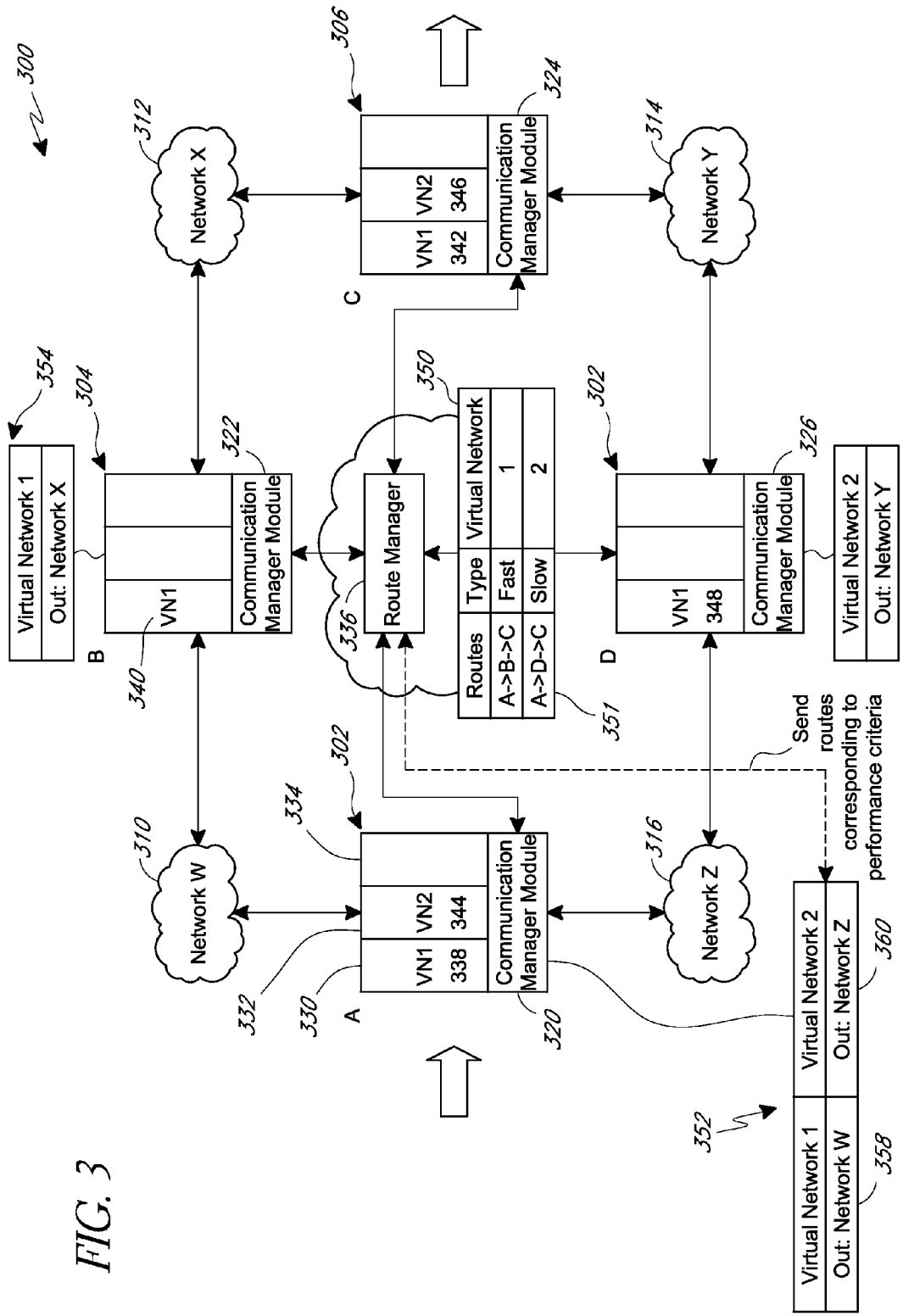
FIG. 3 illustrates an example embodiment of a substrate network configuration wherein routes are determined for associated overlay networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109a, 109b, 109c, 109d of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
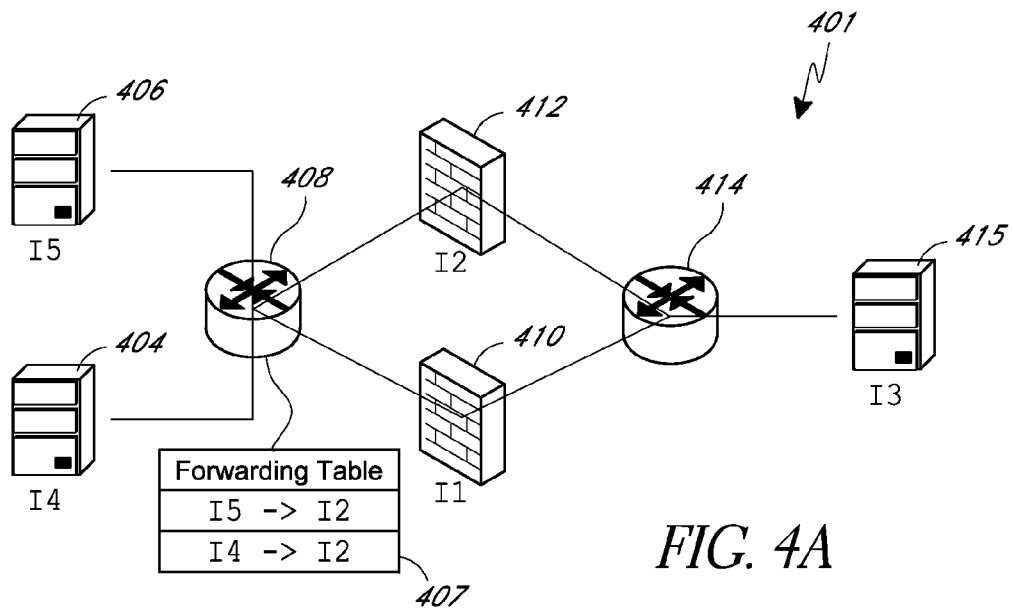
FIGS. 4A and 4B illustrate a virtual network and corresponding substrate network where substrate routing is independently determined from virtual routing.
Figure 4B:
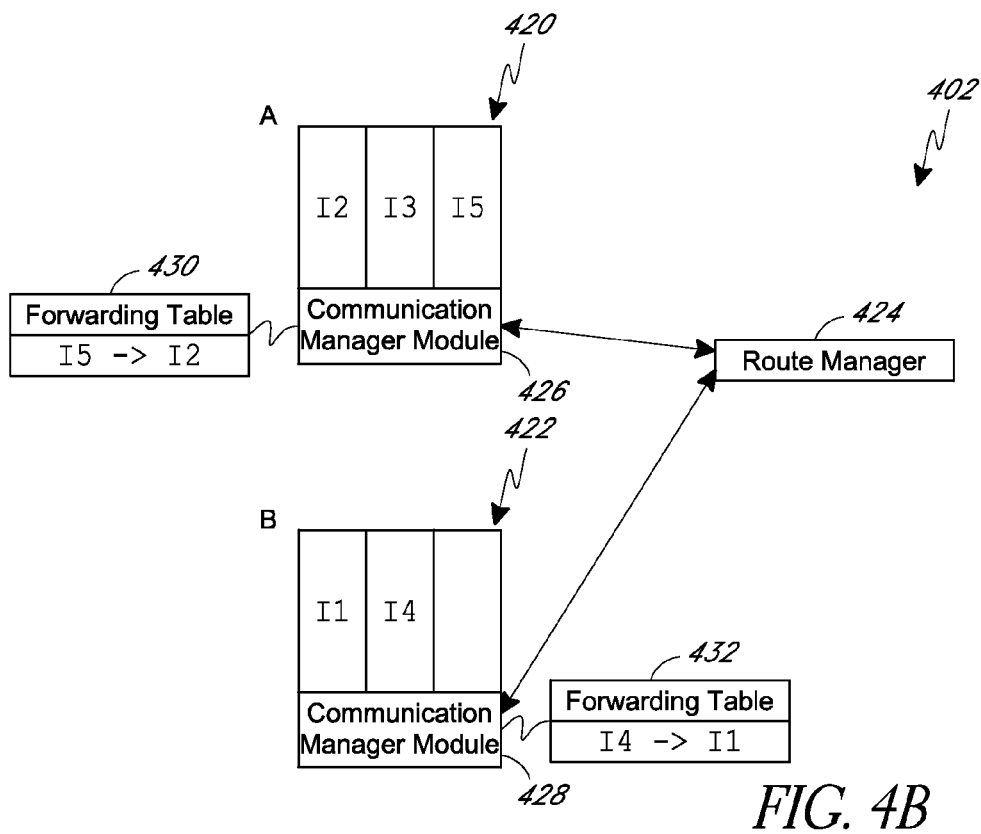

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

Meanwhile, FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3 and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
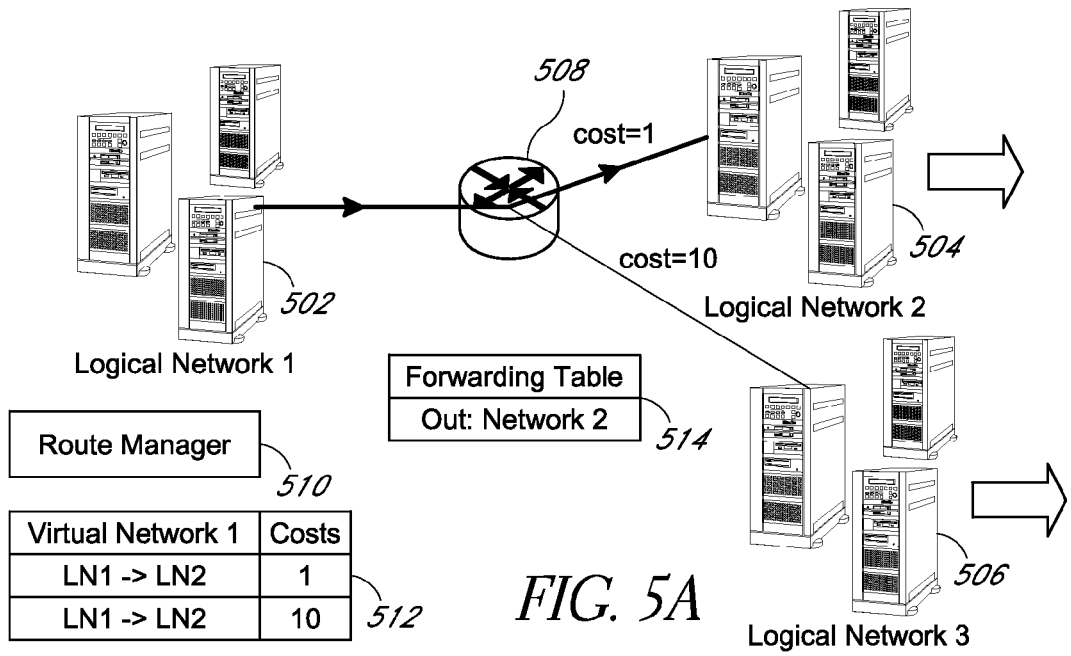
FIGS. 5A and 5B illustrate a virtual route selection propagated to the substrate network.
Figure 5B:
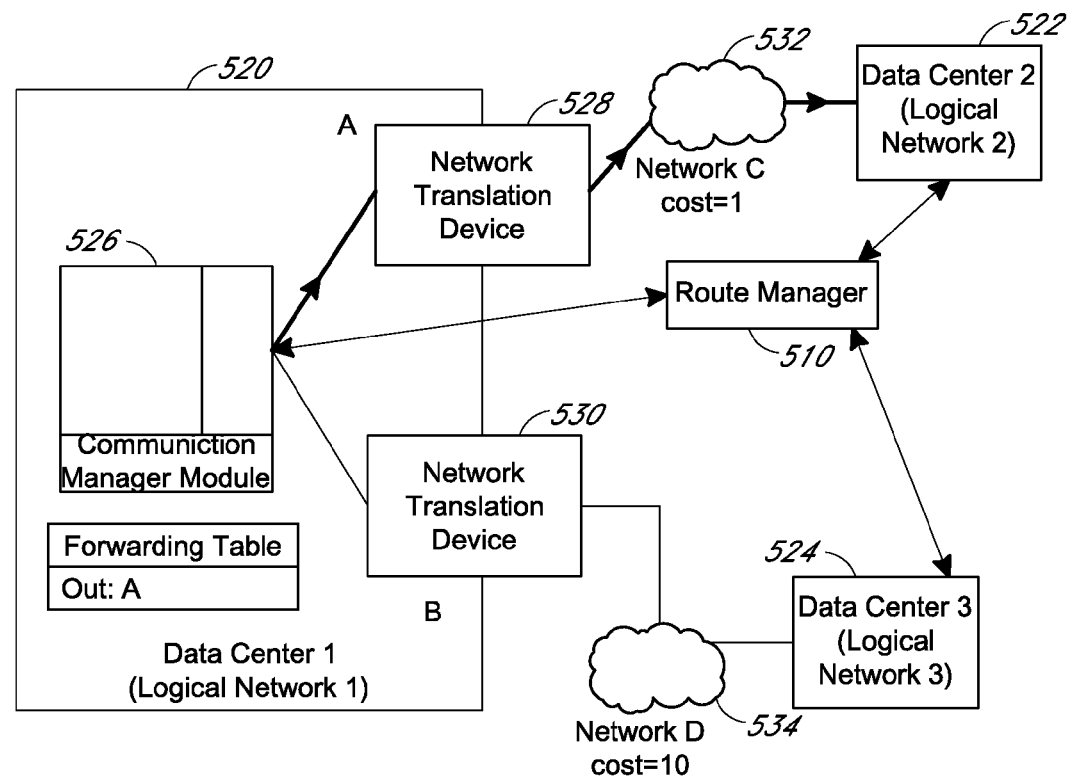

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
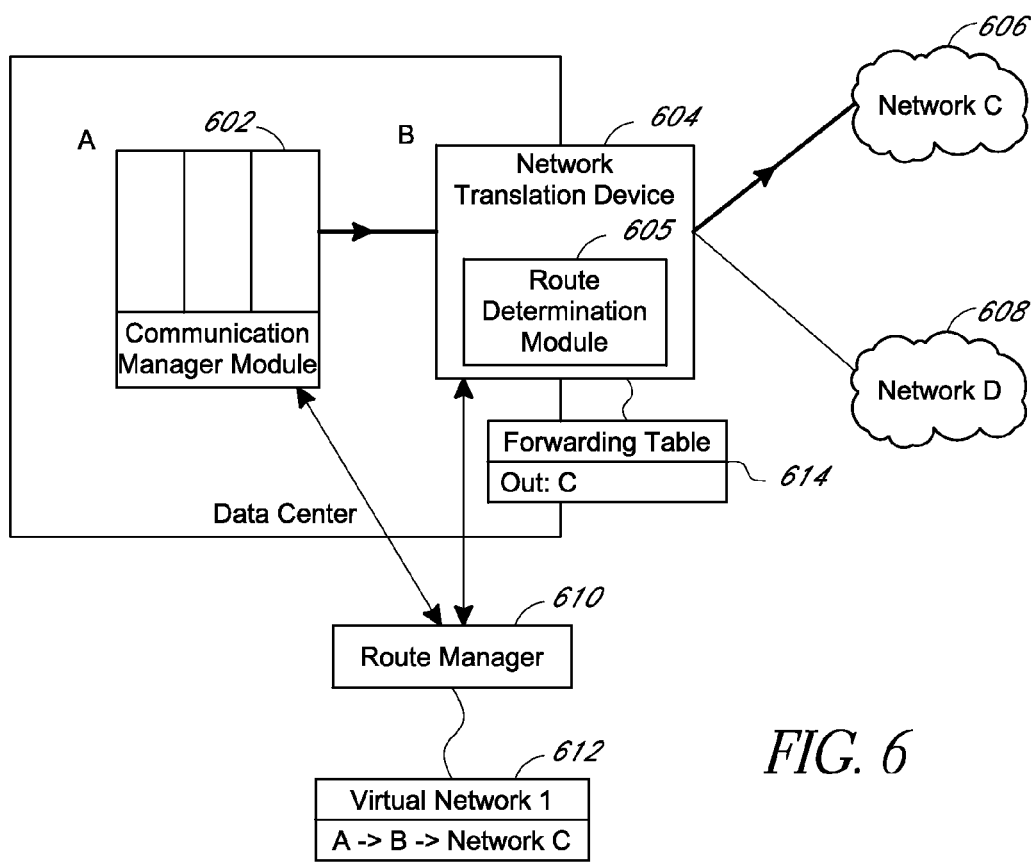
FIG. 6 illustrates an example embodiment of a substrate network, wherein a network translation device determines routes into or out of a virtual network.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
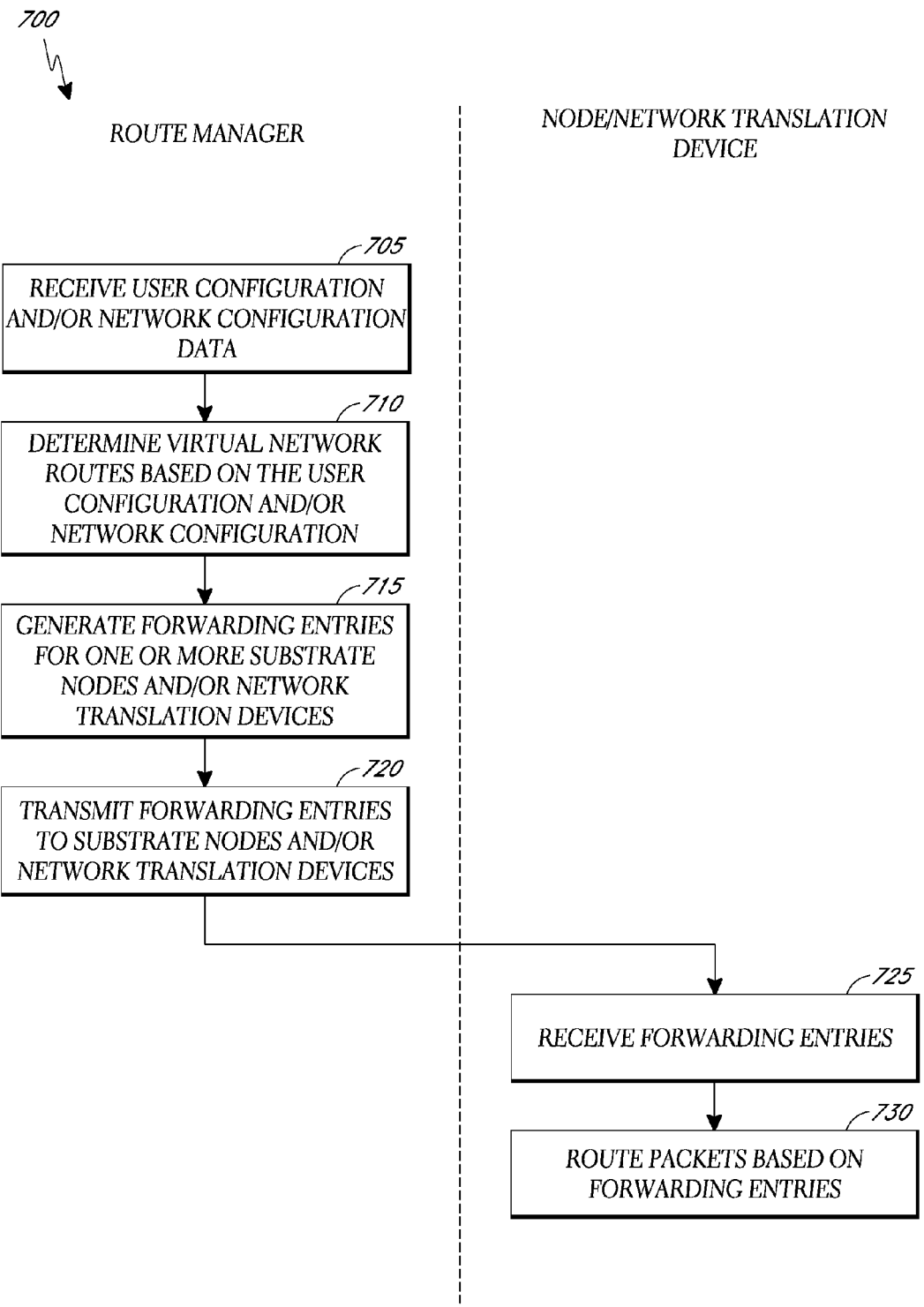
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
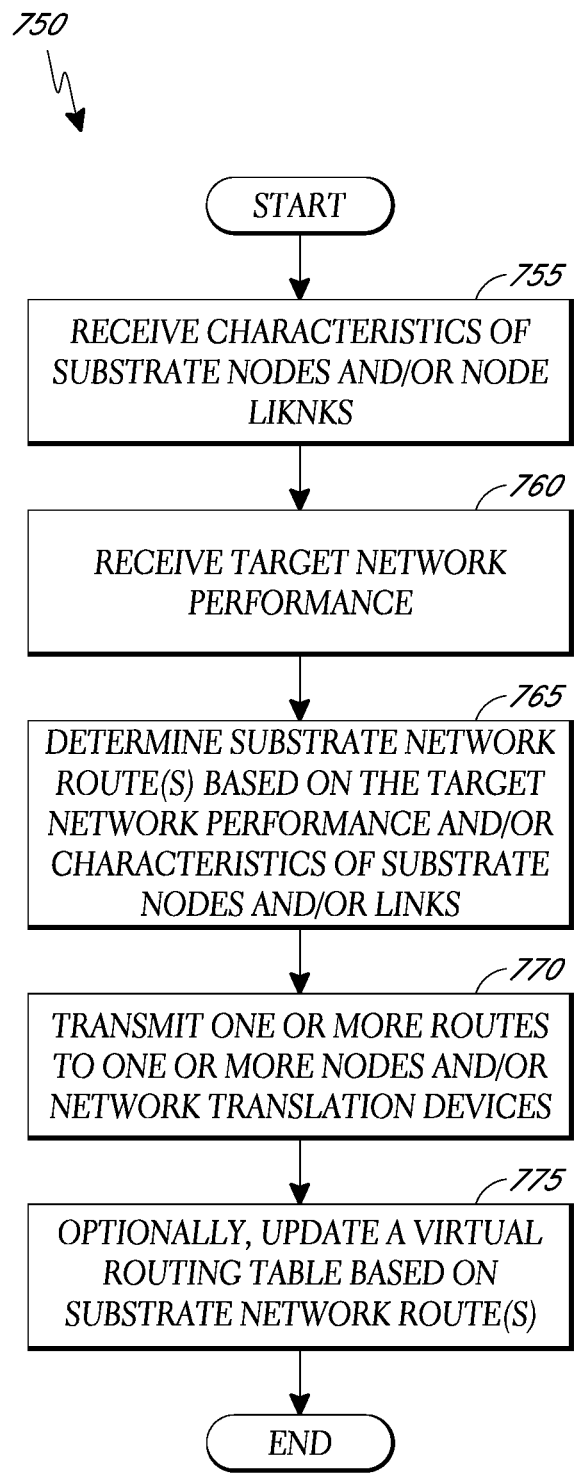
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity to or from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Network Data Transmission Analysis

As discussed herein, network computing systems may implement data loss prevention (DLP) techniques to reduce or prevent unauthorized use or transmission of confidential information or to implement information controls mandated by statute, regulation, or industry standard. Embodiments of network data transmission analysis systems and methods are disclosed that can use contextual information in DLP policies to monitor data transmitted via the network. The contextual information may include information based on a network user's organizational structure or services rather than being based on network topology. In some implementations, contextual information can include information about network infrastructure such as, e.g., intended or expected use or behavior of physical or virtual computing nodes in the network.

FIGS. 8-12 depict various example systems and methods for performing network data transmission analysis. In some embodiments, the systems and methods of FIGS. 8-12 can be implemented on virtual networks, substrate networks, or managed computer networks, such as those depicted in FIGS. 1-7B.

Figure 8:
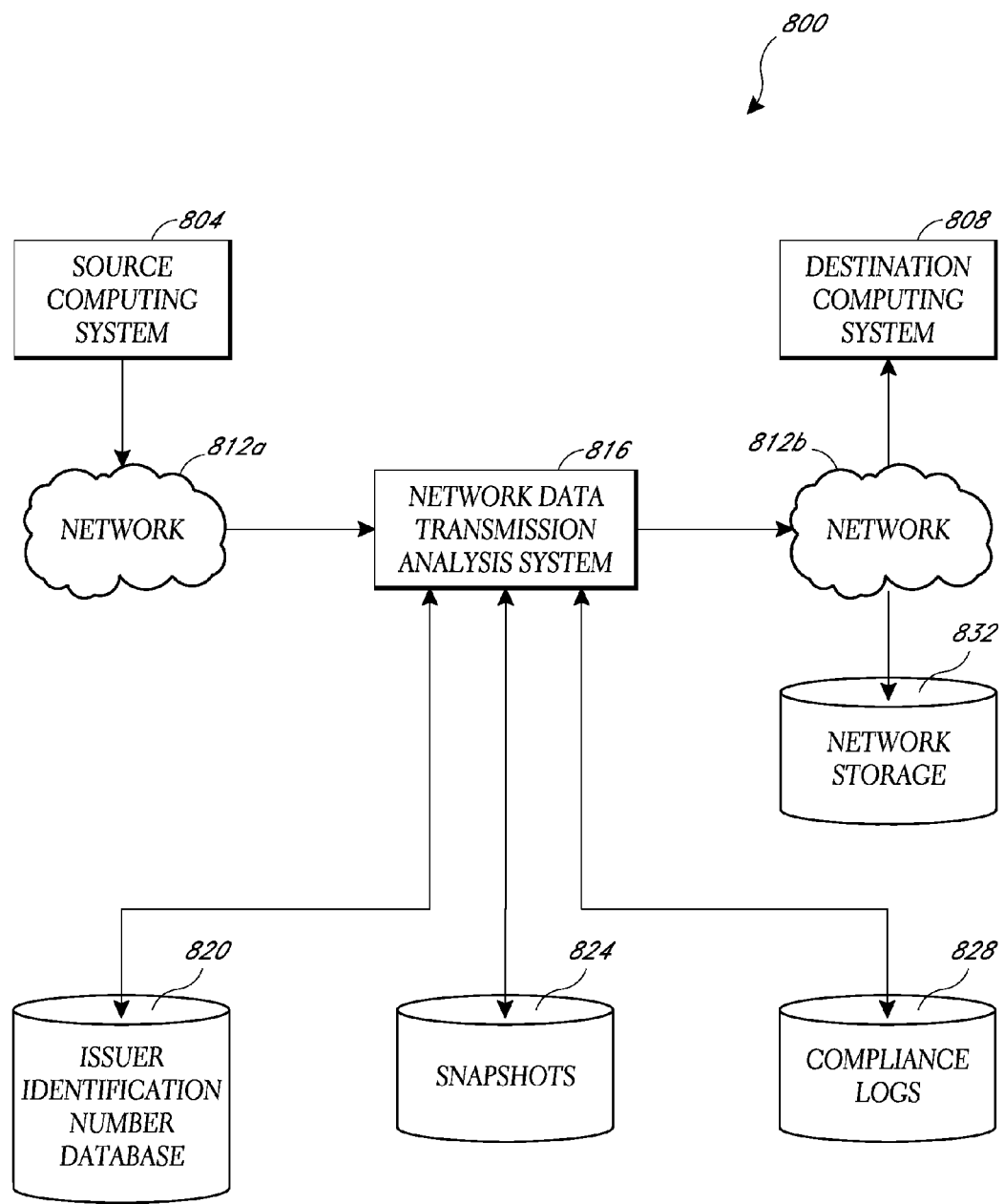
FIG. 8 illustrates an example of a system for network data transmission analysis.

FIG. 8 illustrates an example of a system 800 for network data transmission analysis. The system 800 comprises a source computing system 804 and a destination computing system 808. The computing systems 804, 808 can execute one or more programs on behalf of one or more users. The computing systems 804, 808 may comprise one or more physical computing systems and/or one or more virtual machines that are hosted on one or more physical computing systems. For example, a host computing system may provide multiple virtual machines and include a virtual machine ("VM") manager to manage those virtual machines (e.g., a hypervisor or other virtual machine monitor). The computing systems 804, 808 may include one or more data stores configured to store data transmitted via networks 812a, 812b. In some implementations, network storage 832 can be used to store data transmitted via the networks 812a, 812b.

The computing systems 804, 808 can communicate via one or more communication networks 812a, 812b. One or both of the networks 812a, 812b may, for example, be a publicly accessible network of linked networks, possibly operated by various distinct parties, such as the Internet. In other embodiments, one or both networks 812a, 812b may be a private network, such as, for example, a corporate or university network that is wholly or partially inaccessible to non-privileged users. In still other embodiments, one or both networks 812a, 812b may include private networks with access to and/or from the Internet. In some embodiments, the networks 812a, 812b depicted in FIG. 8 may be part of the same network. One or both of the networks 812a, 812b can be a wired network, a wireless network, a packet switched network, a virtual network, a substrate network, or a managed (e.g., overlay) computer network as described herein.

In the illustrative system 800, the source computing system 804 is presumed to communicate data over the networks 812a, 812b to the destination computing system 808. Typically, the destination computing system 808 can also communicate data over the networks 812a, 812b to the source computing system 804. In a common embodiment, data to be exchanged between the computing systems 804, 808 or to be written to or read from the network storage 832 can be divided into a series of packets. In general, each packet can be considered to include two primary components, namely, control information and payload data. The control information corresponds to information utilized by the communication networks 812a, 812b to deliver the payload data. For example, control information can include source and destination network addresses, error detection codes, packet sequencing identification, and the like. Typically, control information is found in packet headers and/or trailers included within the packet and adjacent to the payload data. Payload data may include the information that is to be exchanged over the communication network.

The system 800 also includes a network data transmission analysis system 816 that can monitor and/or analyze data transmitted via the networks 812a, 812b. In some embodiments, the network data sent to the system 816 can be a "copy" of the original network data transmission (e.g., via a port mirroring or a virtual switched port analyzer (SPAN) port). The network data can have already been forwarded to the intended recipient (e.g., the destination computing system 808) while or before the network data was sent to the system 816 for analysis. As such, the network data analyzed by the system 816 might not need to be forwarded to the intended recipient if no issues are detected in the analysis performed by the system 816.

The network data transmission analysis system 816 can be configured to analyze control information and/or payload information in transmitted data packets based at least in part on a data loss prevention (DLP) policies set or customized by a network user. Generally described, DLP policies may establish one or more user-specified levels of packet monitoring. In one aspect, the DLP policies may be implemented to track, reduce, or prevent unauthorized use or transmission of specific types of information, such as confidential information or sensitive information. In another aspect, the DLP policies may be implemented to track or implement information controls mandated by statute, regulation, confidentiality or privacy standards, or industry standards. For example, a DLP policy may be used to implement medical privacy standards under the Health Insurance Portability and Accountability Act (HIPAA), corporate accounting standards under the Sarbanes-Oxley act (SOX), fraud prevention standards under the Payment Card Industry (PCI) data security standards, information security standards under the Federal Information Security Management Act (FISMA), and so forth. In other examples, DLP policies may be set to establish standards for protection of confidential information stored or owned by an entity, corporation, or organization such as, e.g., trade secrets, intellectual property, financial or accounting data, employee or customer information (e.g., personally-identifiable information, credit card numbers, social security numbers, etc.), and so forth.

DLP policies may include or otherwise incorporate contextual information for an organization. For example, as discussed herein, a network user (e.g., a network administrator for an organization) may configure or specify network configuration data to include organizational details (e.g., departmental structure of the organization) such that a virtual or overlay network can associate network data transmissions (e.g., network packets) as outgoing from or incoming to a particular portion of the organization (e.g., a packet outgoing from an accounting department, a packet incoming to a human resources group, etc.). An organization may establish DLP policies having different security levels based on organizational affiliation information (e.g., DLP policies for employees in human resources departments, accounting departments, engineering departments, etc.). For example, a DLP policy may establish that all data transmitted from a human resources department be analyzed for the presence of portions of social security numbers (e.g., to protect confidentiality of employee information), whereas DLP policies associated with an engineering department may not include the same limitation due to the lower likelihood that numerical data from the engineering department represents portions of social security numbers. In some embodiments, contextual information is based on a network user's organizational structure rather than on network topology. Accordingly, some such embodiments may be advantageous in that DLP policies can track the network as the network grows or changes.

DLP policies may include contextual information based on whether a data transmission is communicated by or received by a computing system (e.g., outgoing versus incoming transmissions). For example, to preserve patient confidentiality under HIPAA, DLP policies may set higher security standards for medical records transmitted from computing systems associated with a medical records department than for medical records received by the same medical records department computing systems.

DLP policies may include contextual information based on network infrastructure. A network user (e.g., a network administrator) can configure or specify network configuration data such that a virtual or overlay network can associate network data transmissions (e.g., network packets) as outgoing from or incoming to a particular portion of the network (e.g., one or more physical or virtual computing nodes or data storage nodes) having an intended or expected use or behavior. For example, the network configuration may specify that certain portions of the network are used as database servers, electronic mail servers, storage devices, etc. A network data transmission analysis system can use network infrastructure information to determine if a network flow communicated to (or from) a portion of the network has attributes expected from or consistent with a DLP-compliant network flow. As one example, the network data transmission analysis system may determine whether a network flow associated with a database server comprises information consistent with database usage (e.g., database queries) rather than information that is more likely consistent with an electronic mail server.

The contextual information of DLP policies may also establish amounts of data that is analyzed (either synchronously or asynchronously). For example, to provide SOX compliance, DLP policies may establish that all of the transmissions originating from a corporate finance department are scanned for specific information. However, DLP policies may establish that none (or at least only a subset) of transmissions from a corporate shipping department are scanned.

DLP policies may establish that the network data transmission analysis system 816 analyze transmitted data for user-specified content, which may, but need not, be based at least in part on the contextual information. For example, the content information of a DLP policy may include information about trade secrets from an engineering department, sensitive financial data from an accounting department, customer credit card data from a billing department, etc. In some implementations, the network data transmission analysis system 816 analyzes payload data (and/or control information) of some or all of the packets for the user-specified content. For example, some such implementations may use regular expression matching to find signatures of user-specified content (e.g., credit card information, social security numbers, etc.) in one or more data packets. DLP policies may establish that the network data transmission analysis system 816 analyze network packets based, at least in part, on any of a source IP address, destination IP address, source MAC address, destination MAC address, communication protocol, Ethernet type, VLAN identifier, source port, destination port, etc.

The user that sets DLP policies may, but need not be, the user of the source and/or destination computing systems 804. In some implementations, DLP policies may be set by a system administrator on behalf of an organization that provides access to the source and/or destination computing systems 804, 808. The system administrator may be required to have sufficient access privileges to set, change, or disable a DLP policy. In some cases, a network can be established such that an election to comply with a particular DLP policy prevents a source or destination computing system 804, 808 from changing or disabling the DLP analysis performed by the network data transmission analysis system 816.

A user with sufficient network privileges may change DLP policies implemented by the network data transmission analysis system 816. For example, prior to an acquisition or merger, a corporation may increase the security level for data transmitted from a corporate accounting or finance department to reduce the likelihood of unauthorized disclosure of "insider information" related to the acquisition or merger. After public disclosure of the acquisition or merger, the corporation may decrease the security level to its usual or normal level.

Users may be charged a fee for the analysis provided by the network data transmission analysis system 816. The fee may be based on the computing resources used by the system 816, on network resources consumed (e.g., bandwidth, number of data flows analyzed, CPU resources, storage size for snapshots or event logs, or the like), combinations of the same, and the like.

The network data transmission analysis system 816 can take one or more actions upon detecting a data transmission that violates one or more DLP policies. As will be further described herein, such actions can include tracing packet routes, taking a snapshot of or redirecting the network flow, firewalling or quarantining a computing system, reducing functionality provided by a suspect computing system, providing enhanced logging or inspection of communications from a suspect system, and so forth. In some implementations, the DLP policy may specify that all network transmissions that meet one or more criteria are to be analyzed. A possible advantage of some such implementations is that the system 816 can perform such an analysis, because, for example, all network flows are transmitted through the virtual network under control of the ONM manager system, and all network flows can, if necessary, be analyzed according to the DLP policy specifications. In some cases, the system 816 may communicate a compliance assurance that includes information related to the analysis of the network flows (e.g., amount or type of network flows, information on matches to the DLP policy, etc.). The compliance assurance may be communicated to a network administrator responsible for the DLP policy, a compliance organization, and so forth.

The implementation of DLP policies by the network data transmission analysis system 800 can advantageously be hidden from or abstracted away from the source and/or destination computing systems 804, 808 in certain embodiments. The encapsulation techniques described herein, for example, may provide for hiding at least some of the physical path of any particular network packet by encapsulating the packet before routing it within the substrate network, and then unencapsulating it upon further transmission. In this way, in certain embodiments, the network path (through the system 800) can be hidden or abstracted from the source and/or destination computing systems 804, 808. More specifically, at least a portion of the network path utilized to execute one or more DLP policies may be abstracted in manner from the source or destination such that the implementation of the DLP policies may not be readily apparent.

In some embodiments, the network data transmission analysis system 816 is performed at the substrate layer described above. For example, a Communication Manager module, such as 210 in FIG. 2, can include a computer that analyzes network flow. The analysis can also be performed by the System Manager modules 210, 260, or 290 on network flows to and from computing node A 205*a* to computing node H 255*b*. Similarly, any of the Communication Manager modules 320, 322, 324, 326, 420, 422, 526, 602; the Route Managers 336, 424, 510, 610; the System Determination module 605 can be programmed to implement the network data transmission system. In some embodiments, the analysis is performed on the virtual network. For example, the analysis can be performed in a virtual network by logical routers 270*a*, 270*b*, 408, 508 or any other appropriate virtual module or set of modules.

In the embodiment illustrated in FIG. 8, network data transmission analysis system 816 includes data repositories 820, 824, and 828. In the illustrated embodiment, snapshots of network data transmission can be stored on the data repository 824, DLP policy compliance logs, event logs, configuration logs, etc. can be stored on the data repository 828, and a database including bank or debit card issuer identification numbers can be stored on the data repository 820 as will be further described herein (see, e.g., FIG. 12). In other embodiments, fewer or greater number of data repositories can be used.

Figure 9:
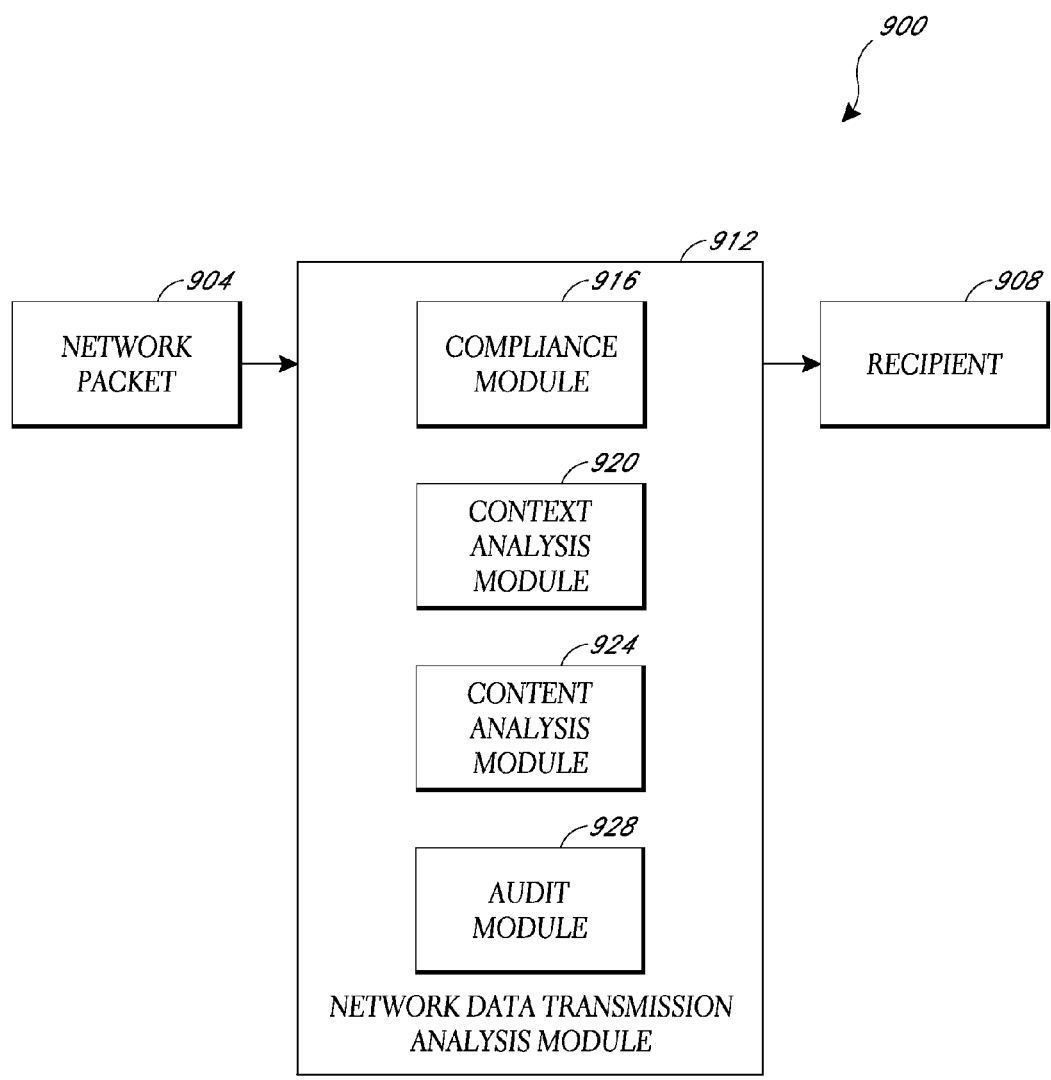
FIG. 9 illustrates an example of a network data transmission analysis system comprising a network data transmission analysis module.

FIG. 9 illustrates an example of a network data transmission analysis system 900 comprising a network data transmission analysis module 912. In this example, a network packet 904 intended for a recipient 908 is routed through and analyzed by the module 912. In other embodiments, the network packet 904 may be a "copy" of the original network packet, as discussed herein. The analysis module 912 comprises a compliance module 916, a context analysis module 920, a content analysis module 924, and an audit module 928. The network data transmission analysis module 912 can be in communication with the data repositories 820-828.

The compliance module 912 may include an Application Programming Interface (API) that permits a computing system to programmatically interact with the network data transmission analysis module 912. As will be discussed with further reference to FIG. 10, a network user can use the API to communicate a user-specified DLP policy to the analysis module 912. The DLP policy can include context data comprising a set of context criteria used by the context analysis module 920 and can include content data comprising a set of content criteria used by the content analysis module 924. As discussed herein, context criteria can include contextual attributes of a networked computing system (e.g., an organizational department or service associated with a source or recipient computing system; infrastructural attributes of the network such as, e.g., intended or expected behavior of network nodes, etc.), directionality of a network flow (e.g., whether incoming to or outgoing from a networked computing system), date or time information, or any type of metadata associated with a network flow. Also as discussed herein, the content criteria can include criteria used to identify confidential information in a data transmission, regular expressions for matching patterns of characters, numbers, symbols, etc. in a data transmission, source and/or destination IP address or port, and so forth.

The DLP policy received by the compliance module 916 and applied by the analysis module 912 may establish that some or all data packets 904 received from one or more networked computing systems are analyzed. In the embodiment illustrated in FIG. 9, the context analysis module 920 determines whether the packet 904 matches one or more of the context criteria. The content analysis module 924 determines whether the packet 904 matches one or more of the content criteria. As one possible illustrative example, consider a DLP policy designed to protect against unauthorized disclosure of customer credit card information. The DLP policy may establish that outgoing data transmissions from a customer billing department are to be scanned for strings that match credit or debit card numbers. In this example, the context analysis module can analyze the network packet 904 to determine if the packet is an outgoing transmission from a computing system associated with the customer billing department. In some implementations, the packet control information (e.g., header and/or trailer) may be analyzed to determine whether a match to the context criteria is found. If so, the content analysis module 924 determines if the packet 904 includes a credit or debit card number. For example, the packet payload may be scanned to determine if there is a match to a regular expression for credit/debit card numbers.

In various embodiments, the context analysis and the content analysis may be performed in serial or in parallel. In some embodiments, if a network packet 904 does not match any of the context criteria (or content criteria), then the content analysis (or context analysis) is not performed.

If a network packet 904 matches one or more context criteria and one or more content criteria, the audit module 928 can perform one or more actions to reduce the likelihood of unauthorized data loss. For example, the actions can include one or more of: (1) tracing a packet route to determine the originating computing system, (2) storing a snapshot of the network flow for archival purposes or for further detailed inspection, (3) not forwarding the network flow to its intended recipient, (4) redirecting the network flow to another process, virtual machine or physical computer for deeper content inspection; (5) firewalling or quarantining a suspect computing system, (6) reducing functionality provided by a suspect computing system, (7) permitting only system administrator level access to a suspect computing system, (8) providing enhanced logging or inspection of communications from a suspect computing system, and so forth. The actions that are selected to be performed can be based, at least in part, on the particular DLP policy, on which context criteria were matched, and/or on which content criteria were matched. Continuing with the illustrative example above, if an outgoing data transmission from the customer billing department includes a credit card number, the audit module 928 may (1) attempt to trace the packet to determine the source computing system in the customer billing department that originated the data transmission and/or (2) not forwarding to their intended recipients data packets that include the customer credit card number.

Figure 10:
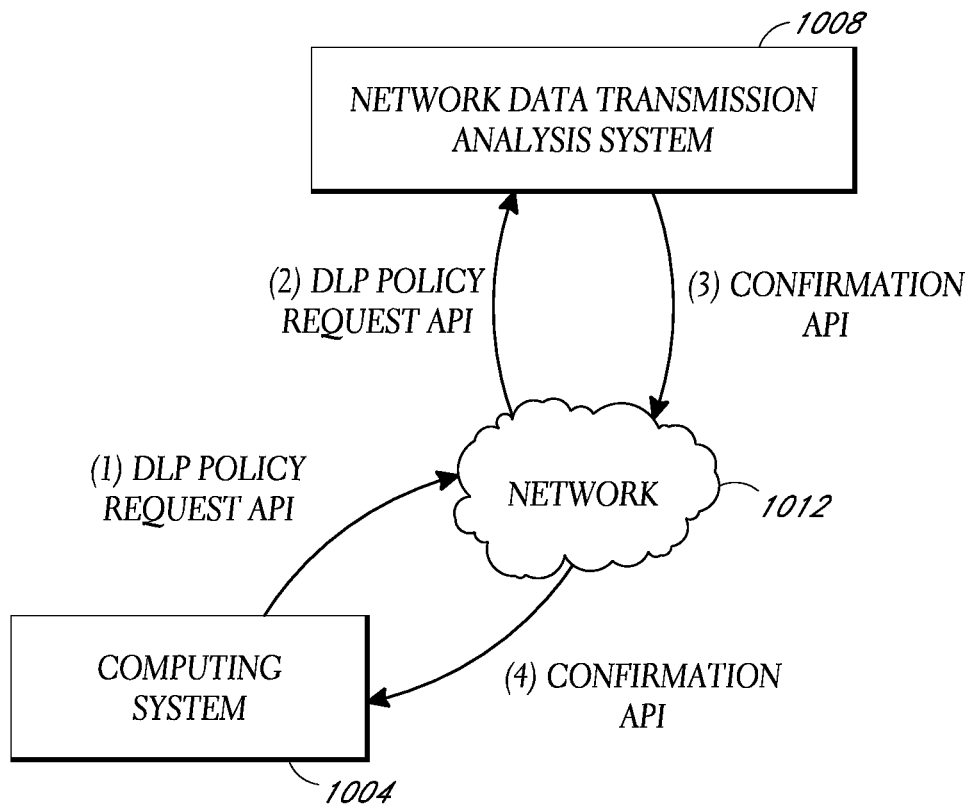
FIG. 10 illustrates an example interaction between a computing system and a network data transmission analysis system.

FIG. 10 illustrates an example interaction between a computing system 1004 and a network data transmission analysis system 1008 via a network 1012, which can be a substrate network, overlay network, packet switched network, the Internet, etc. In this illustrative example, the network data transmission analysis system 1008 provides an API for network user computing systems to programmatically interact with the network data transmission analysis system 1008. FIG. 10 illustratively shows the computing system 1004 communicating a DLP policy via a DLP Policy Request API. In some implementations, only computing systems having a sufficiently high network access privileges (e.g., a network administrator level) can communicate a DLP policy (or change or update thereto) to the system 1008 and/or the system 1008 may only acknowledge and/or implement DLP policies (or changes or updates thereto) if the requesting computing system has sufficiently high network access privileges.

The DLP Policy Request API (1) is communicated via the network 1012 and (2) is received by the network data transmission analysis system 1008. The DLP Policy Request API can include information about the network user's request such as, e.g., the details of the DLP policy, context information, content information, actions to be performed upon identifying a possible data loss, etc. The DLP Policy Request API can also include information related to the scope of the networked computing systems that whose network flows are to be examined, an amount or type of data transmission that is to be analyzed, an start time or expiration time for the DLP policy, whether network flows or "copies" of network flows are to be analyzed, etc. The DLP Policy Request API can include other information such as, e.g., preferences, requirements, and/or restrictions related to the network user's needs for data loss prevention. For example, the DLP Policy Request API can include information related to geographical and/or logical location for the computing systems to be monitored, etc.

In the illustrative example shown in FIG. 10, the network data transmission analysis system 1008 communicates a Confirmation API (3) via the network 1012 which is (4) received by the computing system 1004. The Confirmation API can include information related to whether the system 1008 can grant the DLP Policy Request (in whole or in part). The Confirmation API may also include one or more DLP Policy identifiers (e.g., keys, tokens, passwords, etc.) that are associated with the user's DLP Policy request and that are to be used in conjunction with updating or changing the DLP policy. The confirmation API can include other information such as, e.g., information confirming that the user's preferences, requirements, and/or restrictions can be met by the system 1008. Other types of programmatic interactions (additionally or alternatively) between the network data transmission analysis system 1008 and the computing systems are possible. For example, a request can be received directly from a network user (e.g., via an interactive console or other GUI provided by the program execution service), from an executing program of a network user that automatically initiates the execution of other programs or other instances of itself, etc.

FIG. 11 illustrates an example method 1100 for analyzing data transmitted over a network. The method 1100 can be implemented by the network data transmission analysis system 816 or by any of the other systems described herein. At block 1104, a network flow is received. The network flow can contain data packets, such as IP or TCP data packets, handshake requests, such as a portion of the three-part TCP handshake or an SSL handshake, or any other appropriate data packets. The network flow can be received from a source computing system, such as the computing system 804 shown in FIG. 8. The entity sending the network flow can be a program or computer that is attempting to establish a connection, attempting to send data, attempting to access a module on a webserver, attempting to access an API, such as a web service API, or any other applicable type of entity, performing or attempting to perform any applicable action.

At block 1108, a compliance level is determined based at least in part on a DLP policy. As discussed herein, the compliance level can include information related to the context and/or content to be analyzed for the network flow. If the compliance level indicates that the network flow need not be analyzed, the network flow is forwarded to its intended recipient (if a copy of the network flow is analyzed, then the copy need may not be forwarded). If the compliance level indicates that some or all of the network flow should be analyzed, then at block 1112 the method 1100 can determine whether a compliance log should be created or updated. If so, at block 1116 logging is initiated. The compliance log may include event data associated with DLP policy changes, network configuration changes, networked computing systems, user accounts, data transmissions, attempts to access data stored by networked storage systems, etc. The compliance log may be stored on the data repository 828 show in FIG. 8, and may be stored as, e.g., a database or flat file. In some implementations, a webserver-based data retrieval system or content-addressable storage system is used for accessing or managing the compliance log. The compliance log can be used, at least in part, to generate audit trails, perform forensics, and verify non-repudiation during a compliance audit. In some implementations, a DLP policy may be applied to the compliance log itself, and the method 1100 can analyze changes to or attempts to change the compliance log. In some such implementations, attempts to change the compliance log are permitted (so that an unauthorized user will think he or she was successful in making the change); however, the method 1100 can keep a copy of the unchanged compliance log (for non-repudiation) and may elect to monitor activities by the unauthorized user more closely.

At block 1120, some or all of the network flow is analyzed. For example, as discussed herein, the network flow can be analyzed based on one or more context criteria and/or one or more content criteria established by the DLP policy (or DLP policies). At block 1124, the method 1100 determines whether a portion of the network flow matches one or more of the DLP policy criteria. If there is no match, at block 1128 the network flow can be forwarded to its intended recipient. If there is a match to the DLP criteria, one or more actions can be performed. For example, the method 1100 depicted in FIG. 11 may perform one or more of the actions shown at blocks 1132-1148, which are intended to be illustrative of the types of actions that can be performed and not to be limiting. The method 1100 may determine which actions to perform based at least in part on the DLP policy. For example, as discussed herein, the network flow may be permitted or denied (block 1140) or an action requested to be performed by a data transmission may be denied (block 1148). Packet tracing (block 1136) or enhanced logging of events associated with the network flow (block 1144) may be performed. Other actions may be performed. For example, a portion of the network flow may be redirected in the substrate or overlay network to components with more robust security features having, e.g., additional monitoring functionally, such as a deep-packet scanning ability, or having limited connectivity to or from the rest of the substrate network.

At block 1132, a snapshot of the network flow may be taken. The snapshot can be used for archival purposes or for further detailed inspection. A possible advantage of certain embodiments of the systems disclosed herein is that large amounts of data storage can be quickly added to the network, so that the snapshot can include large volumes of the network flow. In some implementations, a DLP policy may establish that a network flow is buffered for a period of time (e.g., a number of hours or days) or that a certain volume of network flow is buffered (e.g., a number of terabytes). If a triggering event is identified (e.g., criteria match at block 1124), embodiments of the method 1100 may store at least a portion of the buffered network flow in a snapshot for deeper content analysis of the triggering event or for nonrepudiation purposes.

The content of data transmissions may include bank card information (e.g., credit or debit cards). The first six digits of a bank card are the Issuer Identification Number (IIN) that encode the institution that issued the bank card to a card holder (see, e.g., ISO/IEC 7812 standard). To reduce fraud, some network users may attempt to verify that a bank card number provided by a customer actually was issued by an valid issuer. In some cases, the network user may compare the IIN from a customer bank card to a database of IINs that encode valid issuers ("valid IINs"). A possible disadvantage of some current systems is that the database of valid IINs includes only a subset of IINs issued by valid issuers. Accordingly, comparing some valid customer IINs to the database may lead to a rejection of the card as valid, because the issuer's IIN is not listed in the database. In certain embodiments, a network administrator may have a large database of valid IINs. For example, an e-commerce website providing an electronic catalog of items for purchase may accumulate an extremely large database of valid IINs (and/or invalid IINs), because millions of the website's customer use a wide range of bank cards to purchase items. Use of such a large database advantageously may lead to fewer rejections of valid customer bank cards. Accordingly, in some implementations, the network data transmission analysis system 800 includes a data repository 820 that includes a database of valid IINs. The system 800 can analyze data transmissions (e.g., incoming data transmissions from customers) to identify a bank card and then to determine if the bank card appears to have been issued by a valid issuer.

FIG. 12 illustrates an example method 1200 for analyzing bank card information that can be implemented by the network data transmission analysis system 800 (or other systems disclosed herein). The example method 1200 can be based at least in part on a DLP policy that includes a bank card policy associated with identification of bank card information. For example, the bank card information may include information associated with an ITN. At block 1204, a network flow is received which may include bank card information. At block 1208, the network flow can be analyzed to determine whether a portion of the network flow includes bank card information. For example, the method may attempt to identify whether a portion of the network flow includes one or more IINs. At block 1212, the portion of the network flow is analyzed to determine whether there is a match to the DLP policy. The method may determine whether there are matches to context criteria and/or content criteria of the DLP policy. As one possible example, a network flow that includes a bank card number and is incoming to a sales department may not be suspicious (e.g., it may be associated with a customer's order for a product) and may not trigger a match to the DLP policy. However, a network flow that includes a bank card number and is outgoing from an accounting department could be suspicious (e.g., it may represent potential disclosure of confidential customer information) and may trigger a match to the DLP policy. If no match to the DLP policy is found, at block 1216, the method permits transmission of the portion of the network flow that includes the bank card information. If a match to the DLP policy is found, at block 1220, the method performs an action based at least in part on the DLP policy. For example, the actions can include one or more of: (1) tracing a packet route to determine the originating computing system, (2) storing a snapshot of the network flow for archival purposes or for further detailed inspection, (3) not forwarding the network flow to its intended recipient, (4) redirecting the network flow to another process, virtual machine or physical computer for deeper content inspection; (5) firewalling or quarantining a suspect computing system, (6) reducing functionality provided by a suspect computing system, (7) permitting only system administrator level access to a suspect computing system, (8) providing enhanced logging or inspection of communications from a suspect computing system, and so forth.

In some embodiments of the method 1200, the method may include additional or different actions. For example, in some such embodiments, an IIN is extracted from the portion of the network flow that includes bank card information. The IIN can be compared to a database of valid IINs. As discussed, it may be advantage to use a database that includes a large number (e.g., hundreds of thousands) of valid IINs to reduce the likelihood of rejecting a valid bank card. The IIN can be compared to the database to determine whether the bank card was issued by a valid issuing institution. If the IIN is valid, a requested transaction can be permitted (e.g., purchase of an item from an electronic catalog), and if the IIN is found to be invalid, the requested transaction may be denied. Additional actions may be taken in some embodiments. For example, if the IIN is determined to be invalid, the customer's name, account number, etc. may be stored in a database of fraudulent customers or communicated to appropriate authorities. In some cases, the IIN may be determined to be invalid, but may represent a valid bank that is unknown to the system. In some such cases, further information may be requested from the submitter of the bank card information to attempt to determine if the unknown IIN is from a valid bank.

Embodiments of the network data transmission analysis systems disclosed herein may include additional or alternative functionality. For example, some network systems may provide access to storage volumes having a large capacity for data storage. Data to be stored can be transmitted as data packets (e.g., a network flow) via the network (e.g., the networks 812a, 812b) and stored on the network storage 832 (or on storage associated with the destination computing system 808). The network data transmission analysis system 800 can analyze data transmitted to the storage volumes and/or requested from the storage volumes. In some embodiments, the system 800 can use a DLP policy to implement context and/or content matching for storage access requests (e.g., read/write requests). In some such embodiments, the system 800 can monitor and/or correlate storage read/write requests with network requests for the data from networked computing systems. As one possible illustrative example, the network storage 832 may store sensitive information (e.g., corporate trade secrets or customer or patient data subject to privacy regulations). The system 800 can use a storage DLP policy to monitor access requests for the sensitive information. The system 800 may also use a network DLP policy to monitor network requests for the sensitive information so as to provide a more complete understanding of the sequence of actions leading to the access request for the sensitive information. In some implementations, separate DLP policies for storage access requests and for network data transmissions can be used; in other implementations, a single DLP policy can cover both storage access requests and network data transmissions.

In various embodiments, network data transmission analysis systems described herein can be implemented as part of a data center 100 or 160, on a substrate network 300 or 402, as part of a virtual network 401, as part of a logical network 502, 504, or 506, as part of a virtual or physical router, or on any other appropriate substrate, physical, virtual, or logical system described herein.

Conclusion

Depending on the embodiment, certain acts, events, or functions of any of the algorithms, methods, or processes described herein can be performed in a different sequence, can be added, merged, or left out all together (e.g., not all described acts or events are necessary for the practice of the algorithms, methods, or processes). All possible combinations and subcombinations are intended to fall within the scope of this disclosure. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module may be stored on any type of non-transitory computer-readable medium or computer storage device, such as a hard drive, solid state memory, optical disc, and/or the like. A storage medium can be coupled to the processor such that the processor can read information from, and write information to, the storage medium. In some embodiments, the storage medium can be integral to the processor. The processor and the storage medium can reside in an ASIC. The ASIC can reside in a user terminal. In some embodiments, the processor and the storage medium can reside as discrete components in a user terminal. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. No element or feature is necessary or indispensable to each embodiment. The scope of certain inventions disclosed herein is indicated by the appended claims rather than by the foregoing description. All changes which come within the meaning and range of equivalency of the claims are to be embraced within their scope.

What is claimed is:

1. A method for analyzing data transmitted through a virtual network, the method comprising:
    under control of a virtual network comprising a substrate network associated with a plurality of physical computing nodes that are configured to at least partially simulate operation of the virtual network,
    receiving a DLP policy that includes (i) context criteria and (ii) content criteria, the context criteria comprising information about organizational structure or services of a user of the virtual network;
    associating the information about the organizational structure or services of the virtual network user with at least one of the virtual network or the substrate network;
    analyzing, based at least in part on the DLP policy, a network flow transmitted via the virtual network;
    detecting a subset of the network flow that includes a match to at least one of the context criteria of the DLP policy or a match to at least one of the content criteria of the DLP policy; and
    performing an action on at least a portion of the detected subset of the network flow based at least in part on the DLP policy.

2. The method of claim 1, wherein at least some of the plurality of physical computing nodes are configured to host one or more virtual machines, and the network flow is transmitted from or transmitted to one of the one or more virtual machines.

3. The method of claim 1, wherein the DLP policy is associated with one or more of: a policy related to statutory or regulatory compliance, a policy related to industry security standards, or confidential information of the virtual network user or a customer or client of the virtual network user.

4. The method of claim 1, wherein the context criteria comprise information about one or more departments of the organizational structure.

5. The method of claim 1, wherein the context criteria further comprise information associated with network infrastructure related to intended or expected use or behavior of the virtual network.

6. The method of claim 1, wherein performing the action comprises at least one of: (1) tracing a network route taken by the at least a portion of the detected subset of the network flow, (2) storing a snapshot of the at least a portion of the detected subset of the network flow, (3) permitting or denying transmission of the at least a portion of the detected subset of the network flow, (4) logging event data associated with the at least a portion of the detected subset of the network flow, or (5) redirecting the at least a portion of the detected subset of the network flow.

7. The method of claim 1, wherein the virtual network provides an Application Programming Interface (API) for programmatically interacting with the virtual network, and wherein the DLP policy is received via the API.

8. A system for analyzing network data, the system comprising:
    one or more physical computing devices configured to:
    associate a data loss prevention (DLP) policy with a virtual network that is overlaid on one or more physical computing networks, the DLP policy specifying (i) context criteria and (ii) content criteria, the context criteria comprising information about organizational structure or services of a user of the virtual network;
    track data transmitted via the virtual network;
    determine whether at least a portion of the tracked data violates the DLP policy; and
    perform an action on the at least a portion of the tracked data based at least in part on the DLP policy.

9. The system of claim 8, wherein the virtual network comprises one or more virtual machines.

10. The system of claim 9, wherein the data is transmitted from or transmitted to one of the one or more virtual machines.

11. The system of claim 8, wherein the DLP policy is associated with one or more of: a policy related to statutory or regulatory compliance, a policy related to industry security standards, or confidential information of a user of the virtual network or a customer or client of the user of the virtual network.

12. The system of claim 8, wherein the context criteria comprise information about one or more departments of the organizational structure.

13. The system of claim 8, wherein the context criteria further comprise information associated with network infrastructure related to intended or expected use or behavior of the virtual network.

14. The system of claim 8, wherein the action comprises at least one of: (1) tracing a network route taken by the at least a portion of the tracked data, (2) storing a snapshot of the at least a portion of the tracked data, (3) permitting or denying transmission of the at least a portion of the tracked data, (4) logging event data associated with the at least a portion of the tracked data, or (5) redirecting the at least a portion of the tracked data.

15. The system of claim 8, wherein the action comprises storing events associated with the at least a portion of the tracked data in a compliance log, and the events comprise information associated with one or more of: (1) DLP policy changes, (2) network configuration changes, (3) user account changes, or (4) attempts to access the compliance log.

16. The system of claim 8, wherein the data comprises a bank card number, and to determine whether at least a portion of the tracked data violates the DLP policy, the one or more physical computing devices are configured to:
    determine an Issue Identification Number (IIN) from the bank card number; and
    compare the IIN to a database comprising IINs for valid issuers of bank cards.

17. The system of claim 8, wherein to determine whether at least a portion of the tracked data violates the DLP policy, the one or more physical computing devices are configured to:
    analyze the tracked data to detect a first subset of the tracked data that includes a match to at least one of the context criteria; and analyze the first subset of the tracked data to detect a second subset of the tracked data that includes a match to at least one of the content criteria.

18. The system of claim 8, wherein the data comprises a plurality of network packets transmitted via the virtual network.

19. Non-transitory computer storage having computer-executable instructions stored thereon for analyzing network data, the non-transitory computer storage comprising computer-executable instructions for:
  analyzing data transmitted via a virtual network;
  detecting a subset of the data that matches one or more criteria specified by a data loss prevention (DLP) policy, the DLP policy specifying (i) context criteria and (ii) content criteria, the context criteria comprising information about organizational structure or services of a user of the virtual network; and
  in response to detection of the match, storing information associated with the data in a log.

20. The non-transitory computer storage of claim 19, wherein the computer-executable instructions further include instructions for configuring the virtual network such that data transmitted by the virtual network can be associated with the organization structure or services of the user of the virtual network.

21. The non-transitory computer storage of claim 19, wherein the computer-executable instructions include instructions for analyzing the log to determine additional matches to the DLP policy.

22. The non-transitory computer storage of claim 19, wherein the data comprise a plurality of network packets transmitted via the virtual network.

* * * * *